United States Patent Office 2,738,944
Patented Mar. 20, 1956

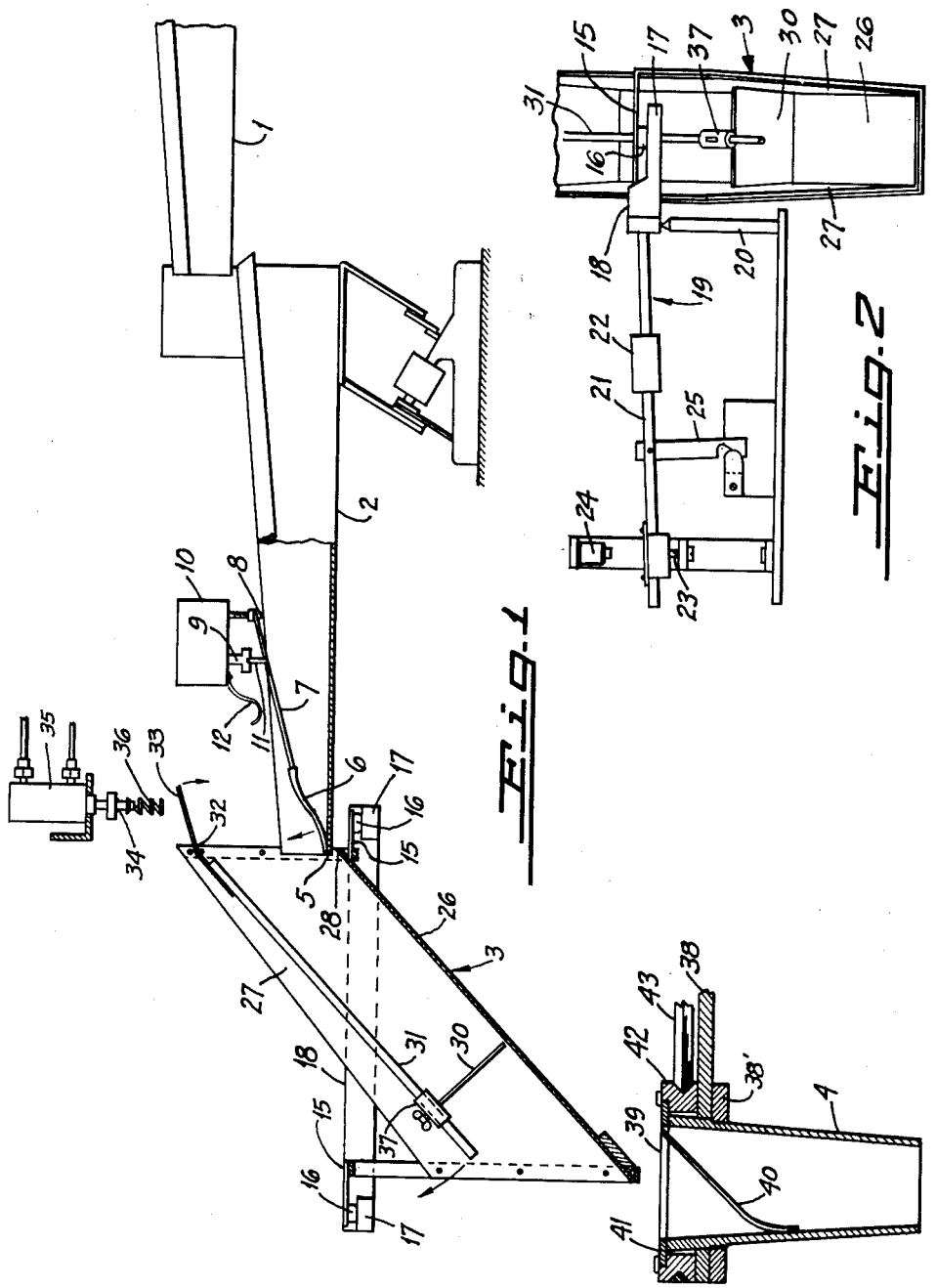

2,738,944

BAG WEIGHING AND FILLING MACHINE

Frank F. Lindstaedt, San Anselmo, and Fred S. Wright, Sonoma, Calif.

Application March 31, 1953, Serial No. 345,776

11 Claims. (Cl. 249—46)

The present invention relates to improvements in a bag weighing and filling machine, and has particular reference to machines of the type described in United States Patent No. 2,546,193, issued to Frank F. Lindstaedt and Charles R. Fischer, and in the pending application, Serial Number 208,412, filed by Frank F. Lindstaedt, Selmer A. Melbostad and Fred S. Wright as co-inventors.

The present invention is directed principally to the weighing apparatus used in connection with the said machines, and its principal object is to provide an improved structure particularly adapted for weighing out the exact amount desired for filling each bag, with a minimum degree of overweight or underweight.

In the prior machines, the material, usually potato chips or macaroni, was fed into a hopper for weighing, by means of a conventional vibrator, and various features were resorted to for making the weight of material to be subsequently discharged into the bag as accurate as possible.

One of the principal difficulties arose in the control of the vibrator cut-off to prevent further feeding after the desired weight had been discharged into the weighing hopper. In the normal operation of the machine, the vibrator would discharge into the hopper disposed underneath the vibrator, and a number of potato chips or strands of macaroni would be freely suspended in transit from the vibrator to the hopper.

The hopper would respond, of course, only to those pieces actually deposited in the same, and would start descending under its weight, regardless of the number of pieces still in transit, which would vary from time to time. With the scales balancing the hopper set for the exact weight, it is apparent that the pieces in transit would each time be added to the weight and would result in a slight overweight for each hopper load.

In the present invention, it is proposed to provide an improved structure whereby the free fall of the pieces of material, particularly toward the end of each weighing operation is practically eliminated, and whereby each piece, immediately upon dropping from the vibrator, makes its weight felt in the hopper.

In carrying out our idea, it is proposed to use a hopper in the form of an inclined chute, with the upper end of the chute arranged immediately adjacent the discharge end of the vibrator, and with a gate provided in the lower end of the chute and positioned to form a weighing chamber therewith.

The weighing chamber is dimensioned to provide just enough room for the weight to be accommodated in the chute, so that during each charging operation the level of the material rises approximately to the level of the vibrator, and there is little or no room left for free falling material when the proper weight has been attained.

It is further proposed to arrange the gate in such a manner that it may be readily adjusted along the length of the chute to provide weighing chambers of different sizes for different desired weights of material, the idea being to arrange in each instance for the level of the material to rise approximately to the level of the vibrator during the charging operation.

Further objects and advantages of our invention will appear as the specification proceeds, and the new and novel features of our machine will be fully defined in the claims attached hereto.

The preferred form of our invention is illustrated in the accompanying drawing, forming part of this application, in which:

Figure 1 shows a side view of our weighing apparatus with attendant features, and Figure 2, an end view of a portion thereof.

While we have shown only the preferred form of our invention, it should be understood that various changes or modifications may be made within the scope of the claims attached hereto, without departing from the spirit of the invention.

Referring to the drawing in detail, our apparatus comprises in its principal features a vibrator 1, a second vibrator 2, a weighing chute 3 and a receiving hopper 4 adapted for discharging into a bag, not shown.

The vibrators 1 and 2 are of conventional form. The vibrator 1 receives the material, such as potato chips, from any suitable source and advances the material toward the second vibrator, which latter again advances the material toward the chute 3, discharging over the front edge 5.

The two vibrators, which are approximately the same width as the chute, serve to smooth out the advancing material, without breaking it, to effect feed into the chute at substantially uniform speed and in a substantially uniform stream.

Over the front end of the vibrator 2 is supported a mat 6 of fairly heavy rubber or similar material, at the end of a lever 7, pivoted as at 8, and adapted to bear down on the material about to pass over the edge for arresting the material.

The mat 6 is urged downwardly by its own weight, and may be pulled upward by a plunger 9 forming part of an electromagnet 10, and connected to the lever by a pivoted link 11. Downward movement of the link is encouraged by a spring 12 which serves as a starter to overcome any possible drag due to residual magnetism in the electro-magnet after the latter is de-energized. The pivot 8 is preferably made adjustable by using a screw support.

The chute 3 is mounted at a rather steep angle, as shown, and is supported by two horizontal frame members 15 swingably suspended, as at 16, on the two arms 17 of a yoke 18.

The yoke forms part of balance 19 swingably supported on two posts 20 and including an arm 21 carrying an adjustable weight 22, the downward swing of the arm being limited by a stop 23, and the upward swing by an electro-magnet 24, which latter serves the further function of positively locking the arm 21 in raised position, when energized, and of positively and immediately releasing the arm when de-energized.

The arm also carries a vane 25 forming part of an electronic vane relay which controls the electro-magnet, to lock the arm 21 in its uppermost position.

The chute 3 is made in the form of a channel and has a flat bottom 26 and side walls 27 rising vertically therefrom, and when the weight 22 outbalances the chute, the upper edge 28 of the chute is disposed immediately adjacent, but slightly below the discharge edge of the vibrator 2.

A gate 30 is mounted across the channel at an intermediate portion thereof, and this gate is supported by a rod 31, which latter is pivoted at the upper end of the channel, as at 32, and has an extension 33 adapted to be depressed by the plunger 34 of a pressure-cylinder 35, the blow of the plunger on the extension being softened by a spring 36. When the extension is depressed, the gate 30 is opened to release the material fed into the chute.

The gate 30 is positioned in the channel in such a manner as to define a chamber just adequate to hold the amount of material to be measured out. Thus, during the loading of the chute, the level of the material will rise approximately to the upper edge 28, with the result that toward the end of the operation, there will be little or no free falling material. Whatever material drops on the chute will, of course, make its weight felt, and as soon as the proper weight has been reached the vibrator will stop and the mat 6 will come down to stop further feeding. As the chute goes down under the weight of the material, there will be no material suspended in the air for adding to the weight.

In case the machine is to be used for filling bags of different sizes with different weights of material, the gate 30 may be made adjustable on the rod 31, as shown at 37, to adjust the size of the chamber above the gate to the weight desired. As another alternative, channels of varying width may be used to adjust the volume above the gate.

The chute discharges into a tapered hopper 4 seated upon a plate 38 and held thereto by a nut 38'. The hopper is generally conical in form and has a ring 39 rotatable on the upper edge thereof, the ring carrying a blade 40 of small cross-section and made to contact the inner wall of the hopper to produce a slight agitating effect which tends to break up accumulations of material and to speed the latter through the hopper, without breaking up the individual pieces.

The ring 39 has an outer flange 41 in a corresponding ledge in a pulley 42 bearing on the plate 38 and adapted to be driven by a belt 43.

The electric elements of the machine, and the pressure-cylinder 35 are controlled by the vane 25. As the arm or beam 21 rises, under the weight of the material, it energizes, through its relay, the electro-magnet 24, for attracting and locking the arm 21 in its uppermost position. Unless a bag is present under the hopper, the magnet 24 will hold the beam in dumping position indefinitely.

At the same time, the electronic relay, through operation of other relays, not shown, de-energizes the vibrator, to stop feeding, and the magnet 10 to drop the mat upon the material to cut off dribbling at the front of vibrator 2.

Simultaneously, the electronic relay operates another relay controlling, in part, the plunger in the cylinder 35 for raising the gate 30, this operation being made subject, through another switch in the circuit, to the presence of a bag at the lower end of the hopper 4. With a bag present, the magnet 24 is now de-energized, and the plunger is relied on for holding the chute in dumping position.

After the bag has been filled, it is removed by means more particularly described in our co-pending application Serial Number 314,316, filed on October 11, 1952.

The dumping period is controlled by a time delay relay, which may be set to correspond to the time required for dumping the load. The time delay relay, at the expiration of the dumping period, through other agencies not shown, operates the plunger 34 to rise, allowing the gate 30 to drop and the chute to rise to its original position.

At the same time, the magnet 10 is re-energized to lift the mat 6 and the vibrators are made to resume operation.

In use, the operator first adjusts the weight 22 on the arm 21 to the load desired for each bag. Next he adjusts the gate 30 in the chute in such a manner that the desired load, when applied to the loading chamber above the gate, will approximately fill the loading chamber and come up to the upper edge of the chute. With these adjustments made, and with the parts in the position shown in the drawing, except that the mat 6 is lifted, the vibrator is set in motion and the material discharges into the chute.

When the proper weight has been loaded into the chute, at which time the material has reached the upper end of the chute, the combined weight of the chute and the load outbalance the weight 22 on the arm 21 and the chute moves downward, causing the outer end of the arm 21 to move upward and come up against the stop 24. At the same time the vane 25 moves upwardly, and through a relay system, not shown, effects the following results:

1. Magnet 10 is de-energized, and drops the mat upon the material in the vibrator to stop further feed;
2. The vibrator magnet is de-energized and causes the vibrator to stop;
3. Magnet 35 is energized and causes the gate 30 to be lifted;
4. Magnet 24 is energized to lock the arm 21 in its uppermost position, and the chute in unloading position;
5. If a bag is presented to receive the load, the magnet 24 is de-energized, and the plunger of the magnet 35 is relied on to hold the bag in dumping position.

The dumping period is controlled by a time delay relay, not shown. At the end of this period, the latter relay operates the plunger 34 to rise, allowing the gate 30 to drop and the chute to rise to its original position. At the same time, the magnet 10 is re-energized to lift the mat 6 and the vibrators are made to resume operations, the arm 21 coming to rest on the stop 30.

We claim:

1. In a machine of the character described, an inclined weighing chute, a balance for the same, the balance being weighted to allow the chute to descend under a predetermined load of material, a vibrator for feeding material into the upper end of the chute, and a discharge gate in the chute spaced from the receiving end and adjustable along the length of the chute so as to bring the level of the material close to the receiving end when the predetermined weight of material has been received.

2. In a machine of the character described, an inclined weighing chute, a balance for the same, the balance being weighted to allow the chute to descend under a predetermined load of material, a vibrator for feeding material into the upper end of the chute, and a discharge gate in the chute spaced from the receiving end and adjustable along the length of the chute so as to bring the level of the material close to the receiving end when the predetermined weight of material has been received, and means operable by the descending chute for stopping the vibrator.

3. In a machine of the character described, an inclined weighing chute, a balance for the same, the balance being weighted to allow the chute to descend under a predetermined load of material, a vibrator for feeding material into the upper end of the chute, a discharge gate in the chute spaced from the receiving end and adjustable along the length of the chute so as to bring the level of the material close to the receiving end when the predetermined weight of material has been received, and means operable by the descending chute for stopping the vibrator, the discharge end of the vibrator being mounted immediately adjacent the receiving end of the chute to reduce the amount of material in free suspension upon the stopping of the vibrator to a minimum.

4. In a machine of the character described, an inclined weighing chute, a balance for the same, the balance being weighted to allow the chute to descend under a predetermined load of material, a vibrator for feeding material into the upper end of the chute, a discharge gate in the chute spaced from the receiving end and adjustable along the length of the chute so as to bring the level of the material close to the receiving end when the predetermined weight of material has been received, and means operable by the descending chute for stopping the vibrator, the discharge end of the vibrator being mounted immediately adjacent the receiving end of the chute to reduce the amount of material in free suspension upon the stopping of the vibrator to a minimum, and means operable in response to the descent of the chute for opening the gate for the discharge of the material from the chute.

5. In a machine of the character described, an inclined weighing chute, a balance for the same, the balance being weighted to allow the chute to descend under a predetermined load of material, a vibrator for feeding material into the upper end of the chute, a discharge gate in the chute spaced from the receiving end to bring the level of the material close to the receiving end when the predetermined weight of material has been received, means operable by the descending chute for stopping the vibrator, the discharge end of the vibrator being mounted immediately adjacent the receiving end of the chute to reduce the amount of material in free suspension to a minimum upon the stopping of the vibrator, and means operable in response to the descent of the chute for opening the gate for the discharge of the material from the chute, the latter means being made to lock the chute in a lowermost position during a pre-determined discharge period.

6. In a machine of the character described, an inclined weighing chute, a balance for the same, the balance being weighted to allow the chute to descend under a predetermined load of material, a vibrator for feeding material into the upper end of the chute, a mat suspended over the vibrator and operable for arresting vibrator feed, a discharge gate in the chute spaced from the receiving end to bring the level of the material close to the receiving end when the predetermined weight of material has been received, means operable by the descending chute for stopping the vibrator and for rendering the mat active, the discharge end of the vibrator being mounted immediately adjacent the receiving end of the chute to reduce the amount of material in free suspension to a minimum upon the stopping of the vibrator, and means operable in response to the descent of the chute for opening the gate for the discharge of the material from the chute, the latter means being made to lock the chute in a lowermost position during a predetermined discharge period.

7. In a machine of the character described, an inclined weighing chute, a balance for the same, the balance being weighted to allow the chute to descend under a predetermined load of material, a vibrator for feeding material into the upper end of the chute, a discharge gate in the chute spaced from the receiving end and adjustable along the length of the chute so as to bring the level of the material close to the receiving end when the predetermined weight of material has been received, and means operable by the descending chute for stopping the vibrator, including means for positively arresting material on the verge of dropping from the vibrator.

8. In a machine of the character described, an inclined weighing chute, a balance for the same, the balance being weighted to allow the chute to descend under a predetermined load of material, a vibrator for feeding material into the upper end of the chute, a discharge gate in the chute spaced from the receiving end and adjustable along the length of the chute so as to bring the level of the material close to the receiving end when the predetermined weight of material has been received, and means operable by the descending chute for stopping the vibrator, including means for positively arresting material on the verge of dropping from the vibrator, the discharge end of the vibrator being mounted immediate adjacent the receiving end of the chute to reduce the amount of material in free suspension to a minimum upon the stopping of the vibrator.

9. In a machine of the character described, a weighing device comprising a frame, pivot means supporting the same intermediate its length, a weight adjustable on the frame on one side of the pivot means, and an inclined weighing chute suspended in the other side of the frame, the chute having a material confining gate mounted therein in spaced relation to the upper end of the chute and with freedom of adjustment along the length of the chute.

10. In a machine of the character described, a weighing device comprising a frame, pivot means supporting the same intermediate its length, a weight adjustable on the frame on one side of the pivot means, and an inclined weighing chute suspended in the other side of the frame, the chute having a rod pivoted thereto at its upper end, with freedom of swinging movement toward and away from the bottom of the chute, and a gate adjustably supported by the rod to form a closure for the chute and to define a variable material-receiving weighing chamber above the gate.

11. In a machine of the character described, a weighing device comprising a frame, pivot means supporting the same intermediate its length, a weight adjustable on the frame on one side of the pivot means, and an inclined weighing chute suspended in the other side of the frame, the chute having a rod pivoted thereto at its upper end, with freedom of swinging movement toward and away from the bottom of the chute, and a gate adjustably supported by the rod to form a closure for the chute and to define a variable material-receiving weighing chamber above the gate, the rod having means cooperating therewith for lifting the gate when the chute descends under the weight of a load received therein.

References Cited in the file of this patent

UNITED STATES PATENTS

| Number | Name | Date |
|---|---|---|
| 1,027,467 | English | May 28, 1912 |
| 1,164,873 | Ross | Dec. 21, 1915 |
| 1,798,775 | Allen | Mar. 31, 1931 |
| 2,226,236 | Bleam | Dec. 24, 1940 |
| 2,466,386 | Curioni | Apr. 5, 1949 |
| 2,545,624 | MacKert | Mar. 20, 1951 |
| 2,546,193 | Lindstaedt | Mar. 27, 1951 |